March 12, 1940.  R. H. GRIFFITH ET AL  2,193,278
PURIFICATION OF COMBUSTIBLE GASES
Filed March 8, 1938
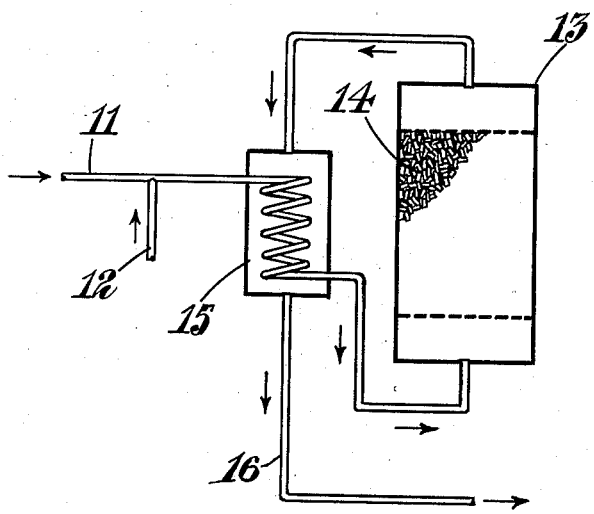
Inventors:
Roland Hall Griffith,
+ John Herbert Goeffrey Plant,
By Stebbins, Blenko + Parmelee,
attys.

Patented Mar. 12, 1940

2,193,278

UNITED STATES PATENT OFFICE 2,193,278

PURIFICATION OF COMBUSTIBLE GASES

Roland Hall Griffith and John Herbert Geoffrey Plant, London, England, assignors to The Gas Light & Coke Company, Westminster, London, England, a British company Application March 8, 1938, Serial No. 194,716
In Great Britain March 19, 1937

4 Claims. (Cl. 23—3)

This invention is for improvements in or relating to the purification of combustible gases, e. g., coal gas, which have already been substantially completely freed from hydrogen sulphide by the usual methods of purification, but which still contain a proportion of sulphur, mainly in the form of organic sulphur compounds such as carbon disulphide, carbon oxysulphide and mercaptan. The presence of such organic sulphur compounds is undesirable, inter alia, because of the sulphur-containing acids to which they give rise when the gas is burned. Among the processes which have been proposed for the removal of such sulphur compounds from combustible gases may be mentioned processes of catalytic hydrogenation whereby the sulphur compounds are converted into hydrogen sulphide.

It is an object of the present invention to convert the organic sulphur compounds and particularly the carbon disulphide into oxides of sulphur or the corresponding acids by a process of catalytic oxidation which may be carried out at a temperature which is in general lower than that necessary for catalytic hydrogenation. It has been found that nickel or cobalt is suitable as a catalyst for such a catalytic oxidation process.

The present invention comprises a process for the removal from combustible gases, from which hydrogen sulphide has already been substantially completely removed, of organic sulphur compounds by catalytic oxidation which comprises passing the gas, containing a small percentage of oxygen, at a temperature not exceeding 350° C. (and preferably at a temperature between 200° and 300° C.) over a catalyst comprising nickel or cobalt. Under these conditions preferential combustion of the organic sulphur compounds takes place with the formation of sulphur dioxide and sulphur acids and the cooled exit gas contains only traces of carbon disulphide and hydrogen sulphide. Complete removal of oxygen from the gas also takes place, the oxygen in excess of that necessary to combine with the sulphur being converted into water. The process results in no large formation of hydrogen sulphide nor does it lead to any appreciable deposition of carbon.

During the early stages of the process the nickel or cobalt is converted into the corresponding sub-sulphide which subsequently acts as the catalyst.

In the case of coal gas, the proportion of oxygen in the gas entering the reaction chamber should, generally speaking, not be less than 0.4% by volume and it has been found that 1% by volume is normally sufficient.

The reaction is an exothermic one and the heat evolved is sufficient to maintain the temperature of the catalyst and to provide an exit gas which is capable of preheating the incoming gas to the temperature of the reaction. The reaction is thus thermally self-supporting.

Small quantities of hydrogen sulphide and free ammonia occur in the exit gas and these materials give rise to the production of free sulphur and ammonium sulphate to a slight extent. It is a characteristic of the present invention that the reaction takes place without the necessity for adding any ammonia to the gaseous mixture.

The process, in addition to removing organic sulphur compounds, including carbon disulphide, carbon oxysulphide and mercaptan, also removes disulphides.

It has been found that the catalysts are preferably formed from the corresponding hydroxides of the metals and that the direct reduction, e. g., of nickel chloride does not result in a satisfactory catalyst.

The catalyst is preferably supported in the surface pores of an inert porous support or carrier and may be formed in situ on the support or carrier by soaking the support or carrier, e. g., of shaped pieces of china clay in a solution, for example a hot solution, of a salt of cobalt or nickel, removing excess solution from the surface of the support, heating to a temperature of about 100° C. in order to drive the solution in the interior of the support or carrier to or near the surface thereof and applying to the product a concentrated solution of a reagent which reacts with the nickel or cobalt salt to produce a precipitate of the catalytic substance. Thus, pellet-shaped pieces of a white china clay may be boiled with a strong solution of cobalt chloride, drained, dried and plunged into a cold solution of caustic soda and subsequently washed with water till free from chloride.

The thin adherent skin of cobalt hydroxide formed on the outside of each piece of china clay is activated by reduction in coal gas at 350° C. The nickelt catalyst may be prepared in a similar way.

Following is a description by way of example and with reference to the accompanying drawing, of one method of carrying the invention into effect.

In the drawing:

Figure 1 is a diagrammatic drawing of apparatus for carrying out the catalytic oxidation of organic sulphur compounds in combustible gas;

Figure 2 is one form of catalyst supported on a cylindrical china clay support, and Figure 3 is a cross-section of Figure 2.

Referring to Figure 1, 11 is the inlet conduit for the gas to be treated, 12 is the conduit for the introduction of oxygen should the gas contain insufficient oxygen for carrying out the catalytic oxidation of the organic sulphur compounds. As sulphuretted hydrogen has previously been removed from the gas by means of iron oxide it will not in general be necessary to introduce more oxygen. 13 is the catalyst vessel containing the amounts of catalyst 14 which consists of shaped china clay supports which may be similar to that shown in Figures 2 and 3. 15 is the heat exchanger for raising the temperature of the gas entering the catalyst chamber 13 by exchange of heat from the gas which has already passed over the catalyst. The treated gas leaves the heat exchanger via the conduit 16.

Referring to Figures 2 and 3, the cylindrical porous support 17 is provided with catalyst 18 only in the pores of the surface layer.

Example

The catalyst for carrying out this invention may be made as follows. Shaped pieces of a white china clay are boiled with a strong (nearly saturated) solution of nickel chloride for from 5 to 10 minutes, drained rapidly of surface liquid and dried at an elevated temperature. They are then plunged into a cold solution of 20% caustic soda and after a few minutes are washed in a stream of water till free from chloride. A thin adherent skin of nickel hydroxide is thus formed on the outside of each piece, the inside of which is substantially free from nickel hydroxide. The catalyst vessel 13 is packed with the catalyst 14 prepared as described above and the catalyst is activated by reduction in coal gas at 350° C.

Coal gas from which hydrogen sulphide has previously been removed substantially completely by purification by means of iron oxide in the usual way is passed (without the addition of further oxygen) through the heat exchanger 15 and thence through the catalyst vessel 13. The gas is pre-heated in the heat exchanger to about 180° C. and is passed through the catalyst at a rate of 1,500 to 2,000 volumes of gas per hour per unit volume of catalyst space.

While the inlet gas contained approximately 30 to 35 grains of total sulphur per 100 cubic feet, the gas leaving the catalyst vessel contained, after cooling, less than 2 grains of sulphur per 100 cubic feet, expressed as carbon disulphide. The sulphur compounds formed in the reaction are removed from the treated gas by known methods.

In the reaction metallic nickel or cobalt are first converted to nickel sulphide or cobalt sulphide by interaction with the sulphur compounds in the gas and these sulphides are subsequently reduced to the corresponding sub-sulphides which constitute the active catalytic material.

We claim:

1. A process for the catalytic oxidation of organic sulphur compounds in combustible gases containing a proportion of oxygen between 0.4 and 1.0% by volume and from which hydrogen sulphide has been substantially completely removed which process comprises passing the gas at a temperature between 200° and 350° C. in contact with a catalyst selected from the group consisting of the sub-sulphide of nickel and the sub-sulphide of cobalt supported in the surface pores of a catalytically inactive but porous support.

2. A process for the catalytic oxidation of organic sulphur compounds in combustible gases containing a proportion of oxygen between 0.4 and 1.0% by volume and from which hydrogen sulphide has been substantially completely removed, which process comprises passing the gas at a temperature between 200° and 350° C. in contact with a catalyst consisting of the sub-sulphide of nickel supported in the surface pores of a catalytically inactive but porous support.

3. A process for the catalytic oxidation of organic sulphur compounds in combustible gases containing a proportion of oxygen between 0.4 and 1.0% by volume and from which hydrogen sulphide has been substantially completely removed, which process comprises passing the gas at a temperature between 200° and 350° C. in contact with a catalyst consisting of the sub-sulphide of cobalt supported in the surface pores of a catalytically inactive but porous support.

4. A process for the catalytic oxidation of organic sulphur compounds in combustible gases containing a proportion of oxygen between 0.4 and 1.0% by volume and from which hydrogen sulphide has been substantially completely removed, which process comprises passing the gas at a temperature between 200° and 350° C. in contact with a catalyst consisting of shaped pieces of china clay having formed in their surface pores a compound selected from the group consisting of the sub-sulphide of nickel and the sub-sulphide of cobalt and derived from nickel hydroxide and cobalt hydroxide formed in situ.

ROLAND HALL GRIFFITH.
JOHN HERBERT GEOFFREY PLANT.